United States Patent [19]
Nelson et al.

[11] Patent Number: 5,586,635
[45] Date of Patent: Dec. 24, 1996

[54] ROTATIONAL CONTROL APPARATUS

[75] Inventors: Chris Nelson, Roseville; David R. Hennessy, Minneapolis; James P. LeClaire, St. Paul, all of Minn.

[73] Assignee: Horton, Inc., Minneapolis, Minn.

[21] Appl. No.: 414,279

[22] Filed: Mar. 31, 1995

[51] Int. Cl.⁶ .................................... F16D 25/06
[52] U.S. Cl. ................. 192/85 A; 192/88 A; 192/113.23
[58] Field of Search ................ 192/85 A, 88 A, 192/88 R, 113.23, 113.26

[56] References Cited

U.S. PATENT DOCUMENTS

| | | |
|---|---|---|
| 1,808,240 | 6/1931 | Mahana . |
| 1,978,687 | 10/1934 | Pearmain et al. . |
| 2,221,014 | 11/1940 | Williamson . |
| 2,241,242 | 5/1941 | Friedman . |
| 2,734,401 | 2/1956 | Berndtson ..................... 192/85 A X |
| 2,785,781 | 3/1957 | Johansen ..................... 192/88 A X |
| 2,887,202 | 5/1959 | Wilson ........................ 192/88 A X |
| 3,062,347 | 11/1962 | Hornbostel ................... 192/88 A X |
| 3,237,738 | 3/1966 | Suppes et al. ................ 192/88 A X |
| 3,311,205 | 3/1967 | Suppes et al. . |
| 3,385,410 | 5/1968 | Hornbostel, Jr. . |
| 3,506,101 | 4/1970 | Fey . |
| 3,637,053 | 1/1972 | Boyles ....................... 192/85 A X |
| 3,690,429 | 9/1972 | Honda . |
| 4,139,085 | 2/1979 | Kanbe et al. . |
| 4,427,102 | 1/1984 | Schilling .................... 192/85 A |
| 4,657,126 | 4/1987 | Hanks et al. ................. 192/85 A X |

*Primary Examiner*—Andrea L. Pitts
*Attorney, Agent, or Firm*—Peterson, Wicks, Nemer & Kamrath, P.A.

[57] ABSTRACT

A rotational control apparatus (A) having a rotatable input (26 or 180) and output (26 or 180) with respective interface discs (106, 180). Three sets of two diametrically opposed pistons (64 and 66, 68 and 70, 72 and 74) are controllable to rotatably relate the interface discs (106, 180). The piston sets (64 and 66, 68 and 70, 72 and 74) include piston heads (76) with dissimilar diameters such that each of the sets of pistons (64 and 66, 68 and 70, 72 and 74) may apply a dissimilar torque for a given amount of air pressure. Each of the piston sets (64 and 66, 68 and 70, 72 and 74) may be actuated independently or in combination with each of the other sets of pistons (64 and 66, 68 and 70, 72 and 74) such that the interface discs (106, 180) may be rotatably related to each other with varying degrees of torque. The rotational control apparatus (A) also includes a unique interface disc (106) with a frustoconical annular projection (136) for drawing relatively hot air away from the hub (26) near the interface disc (106) and out of the apparatus (A). The rotational control apparatus (A) further includes a unique set of axially extending channels (38, 60, 111) for the conveyance of air for cooling the interface discs (106, 180) from a location remote from the interface discs (106, 180). Blades (152) on interface disc (106) draw relatively cool air through the channels (38, 60, 111) to the hub (26) near the interface disc (106).

28 Claims, 2 Drawing Sheets

ROTATIONAL CONTROL APPARATUS

BACKGROUND

The present invention relates generally to rotational control apparatus, particularly to pneumatically operated rotational control apparatus, and specifically to clutches.

Rotational control apparatus, including clutches, are often operated pneumatically. Pneumatic operation, however, may not provide for good control of rotation at relatively low torque loads, especially where the same pneumatically controlled apparatus is expected to meet relatively high torque loads. Further, pneumatic control of incremental decreases or increases in torque loads is troublesome. Still further, overheating of pneumatic clutches near the splined hub and rotor engagement is a problem which is still of concern.

SUMMARY

Accordingly, a general object of the invention is to provide a unique rotational control apparatus for relatively low torque applications and for applications requiring varying torque loads.

Another object of the invention is to provide methods and a rotational control apparatus which uniquely include three separate and independent means for moving interface discs from a second condition to a first condition where the discs are respectively rotatably independent from each other and rotatably related. While controllable independently from each other, the three separate and independent means are also controllable in combination. Hence varying degrees of torque may be applied to the interface discs of the control apparatus for greater control of rotation.

Another object of the invention is to provide a rotational control apparatus which uniquely includes three separate and independent pairs of pneumatic pistons which are controllable independently from each other or in combination to permit varying degrees of torque to be applied to interface discs of the control apparatus. Specifically, each pair of pistons includes pneumatically driven distal heads having a different amount of surface area from each of the other pairs. Therefore, for a given air pressure, the proximal ends of each pair of pistons deliver linear forces of a degree different from each of the other pairs. Thus, different degrees of torque may be applied to the interface discs with one given air pressure.

Another object of the invention is to provide a unique interface disc. Specifically, the interface disc is self-cooling by drawing air away from its base area near the splined hub and by then channeling such air radially and outward therefrom. The induction of air from the base of the rotor is accomplished at least in part by a plate extending nonradially from the base and including openings formed therein. The plate is frustoconical in shape and mounts blades intermediate the openings which draw air for cooling as the disc is rotated.

Another object of the invention is to provide a rotational control apparatus with a unique housing which draws air from a remote source of air for cooling. The housing includes proximal and distal ends with the proximal end being adjacent to the interface discs. Channels extend generally axially in the housing with channel inlets formed on the distal end of the housing and channel outlets formed adjacent the proximal end of the housing near the interface discs. Air is drawn from the distal end of the apparatus, through the housing and the outlets, and to the interface discs.

It is further an object of the present invention to provide such a rotational control apparatus which is of simple construction.

It is further an object of the present invention to provide such a rotational control apparatus which is easily manufactured and assembled.

It is further an object of the present invention to provide such a rotational control apparatus which permits easy maintenance of manufacturing tolerances.

It is further an object of the present invention to provide such a rotational control apparatus which has a clutching action between the input and output.

It is further an object of the present invention to provide such a rotational control apparatus which permits standardization of components.

It is further an object of the present invention to provide such a rotational control apparatus which permits a standard design which may be modified according to the particular application.

It is further an object of the present invention to provide a rotational control apparatus for performing continuous or cyclic duties.

It is further an object of the present invention to provide a rotational control apparatus for control sensitive applications.

It is further an object of the present invention to provide such a rotational control apparatus which provides the primary function of tension control of wind-ups and unwinds.

It is further an object of the present invention to provide such a rotational control apparatus which may be used as a brake by locking one of the interface discs in an un-wind application.

These and further objects and advantages of the present invention will become clearer in light of the following detailed description of an illustrative embodiment of this invention described in connection with the drawings.

BRIEF DESCRIPTION OF THE DRAWINGS

The illustrative embodiment may be best described by reference to the accompanying drawings where.

Figure 1:
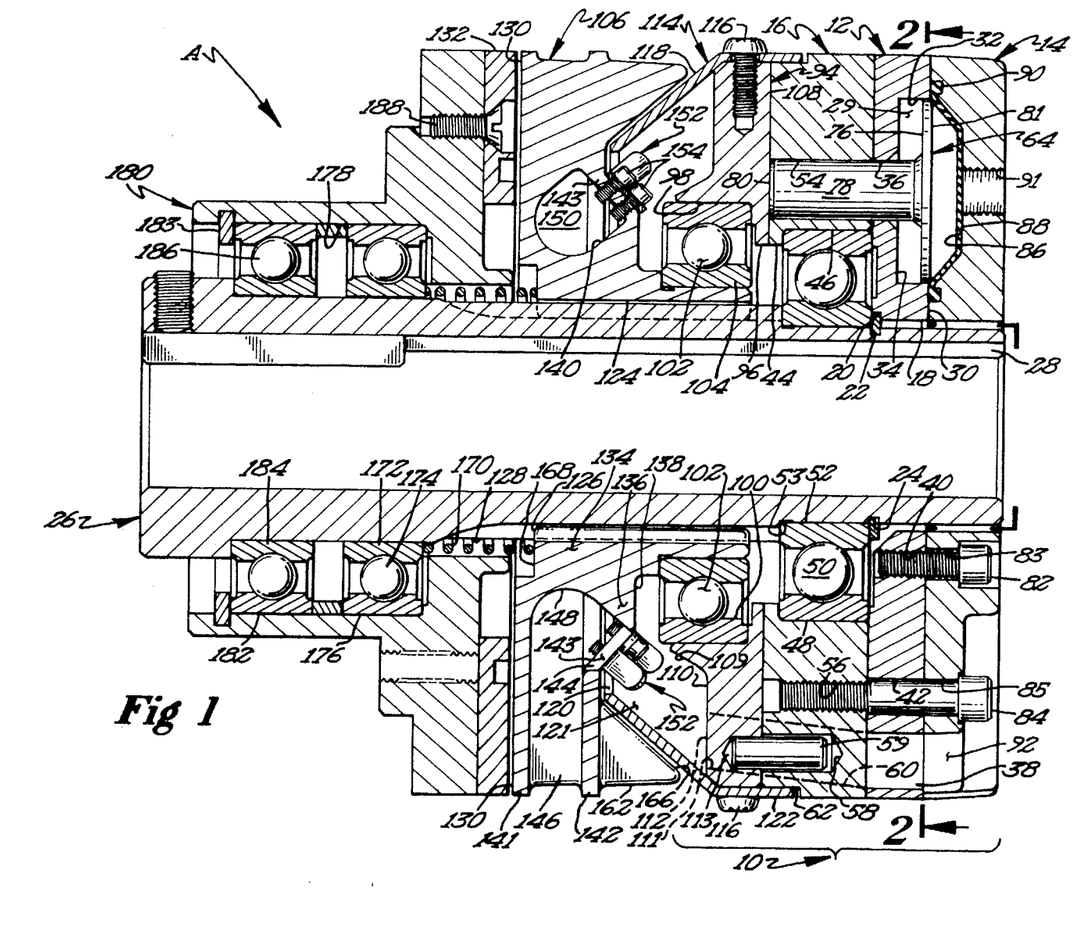
FIG. 1 shows a cross sectional view of a preferred form of a rotational control apparatus according to the preferred teachings of the present invention.
Figure 2:
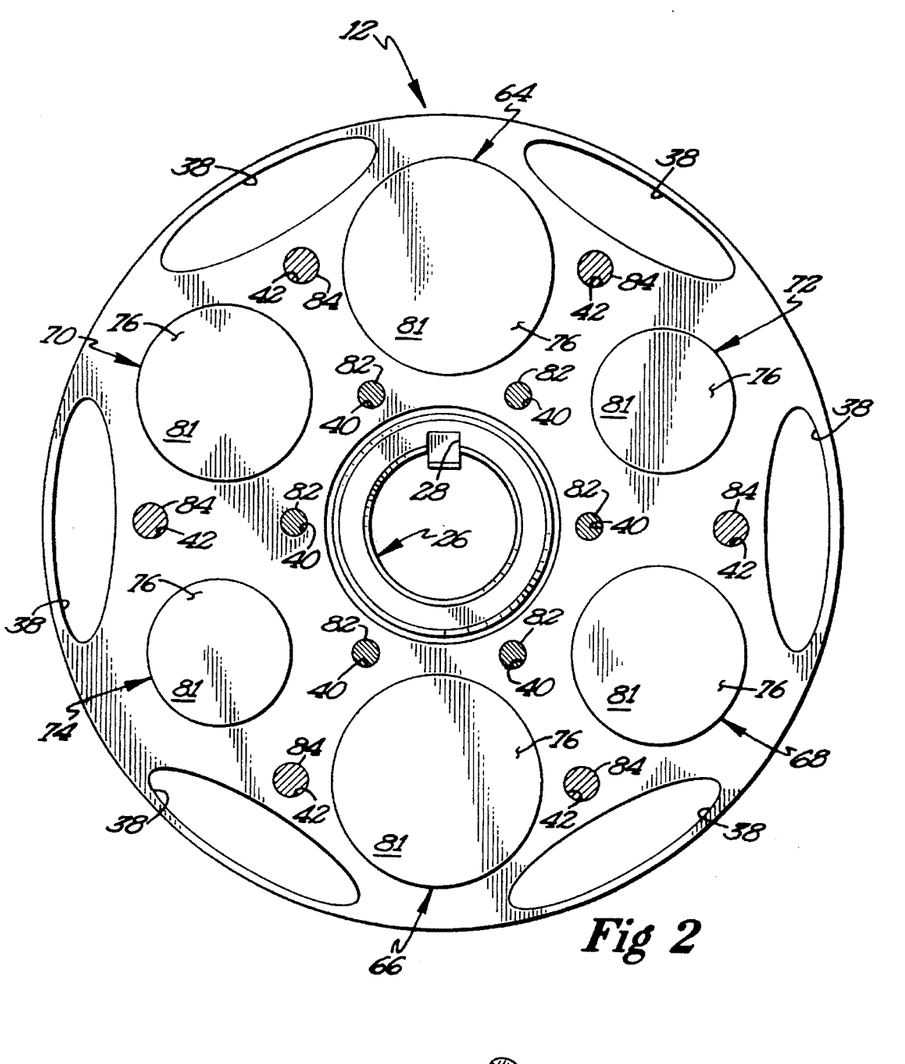
FIG. 2 shows a cross sectional view of the rotational control apparatus of FIG. 1 according to section lines 2—2 of FIG. 1.
Figure 3:
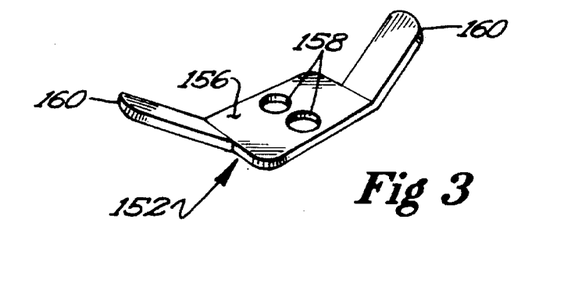
FIG. 3 shows an isolated perspective view of a preferred form of a blade of the interface disc of the rotational control apparatus of FIG. 1.

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Further-more, when the terms "axial", "end", "peripheral", "radial", "inner", "internal", "inwardly", "outer", "forward", "first", "second", "third" and similar terms are used herein, it should be understood that these terms have reference only to the structure shown in the drawings as it would appear to a person viewing the drawings and are utilized only to facilitate describing the preferred embodiment.

DESCRIPTION

Referring to the drawings in detail, a rotational control apparatus configured as a dry friction interface type clutch is shown according to the preferred teachings of the present invention and generally designated A. Clutch A includes a two-piece housing 10, with one piece of housing 10 including the stationary cylinder 12, the stationary end cap 14 for the cylinder 12 and the stationary piston guide 16. The stationary cylinder 12 includes the inner annular surface 18o Formed in the cylinder surface 18 is the annular recess 20 in which is positioned the snap retainer ring 22. The snap retainer ring 22 is further positioned in the annular recess 24 in the rotatable hub 26 formed with the internal keyway 28. The stationary cylinder 12 further includes six piston head receptors 29 set into the cylinder face 30. Each of the piston head receptors 29 is formed by the annular wall or piston head guide 32 and the piston head stop 34. The cylinder 12 further includes six piston shaft guides or annular walls 36 formed therein. The cylinder 12 further includes six air channel portions 38 formed in a peripheral region of stationary cylinder 12. Each of the channel portions 38 is elliptical in section transverse to the hub 26. The channel portions 38 extend generally in an axial direction. The cylinder 12 further includes six threaded openings 40 for receiving pin connectors and six nonthreaded openings 42 for receiving nonthreaded shaft portions of pin connectors.

The piston guide 16 is formed with the reduced diameter annular surface 44 and the greater diameter annular surface 46 into which is slid the outer race 48 of bearing 50. Outer race 48 is sandwiched between the shoulder formed by surface 46 and cylinder 12. The inner race 52 of the bearing 50 is slid on the rotatable hub 26 and sandwiched between a shoulder 53 formed on hub 26 and snap ring 22. The stationary piston guide 16 further includes six annular openings or guides 54 for guiding piston shafts. Each of these piston guides 54 have a shape, size and location corresponding to one of the piston guides 36 of the cylinder 12. The stationary piston guide 16 further includes six threaded openings 56 for receiving pin connectors. Each of these threaded openings 56 have a size and location corresponding to one of the openings 42 of the cylinder 12. The stationary piston guide 16 further includes a plurality of bores 58 for slideably receiving dowel pins 59. The stationary piston guide 16 further includes six air channel portions 60 formed in an elliptical shape in section transverse to the hub 26 to maximize flow area but minimize radial size. These channel portions 60 extend generally axially but also extend slightly inwardly toward the hub 26 as they extend away from the cylinder 12. Further, these channel portions 60 widen progressively in the axial direction away from the cylinder 12. Each of these channel portions 60 have a size, shape and location corresponding to one of the channel portions 38 of the cylinder 12. The piston guide 16 further includes a reduced outer annular surface 62.

The stationary cylinder 12 and piston guide 16 slideably mount a first set of diametrically opposed pistons 64 and 66, a second set of diametrically opposed lo pistons 68 and 70, and a third set of diametrically opposed pistons 72 and 74.

Each of the pistons 64, 66, 68, 70, 72, and 74 includes a piston head 76, the piston shaft 78, and the piston distal end 80. The piston heads 76 have an outer disc shaped surface area 81 which in the preferred form are of the same size in each of the respective sets of pistons 64 and 66, 68 and 70, and 72 and 74. The outer surface area 81 of each of the pistons 64 and 66 of the first set is greater than the outer surface area 81 of each of the pistons 68 and 70 of the second set which in turn is greater than the outer surface area 81 of each of the pistons 72 and 74 of the third set. The outer surface areas 81 have a diameter typically in the range from about one inch (2.54 cm) to about 1.5 inches (5.08 cm).

The stationary end cap 14 is fixed relative to the cylinder 12 by six pin connectors 82 extending through openings 83 formed in end cap 14 and threaded in openings 40 of the cylinder 12. Cylinder 12 and end cap 14 are fixed relative to the piston guide 16 by pin connectors 84 extending through openings 85 formed in end cap 14 and openings 42 of cylinder 12 and threaded in openings 56 of the piston guide 16. Set ill the end cap 14 are six frustoconical walls or diaphragm receptors 86 for receiving diaphragms 88 which in their decompressed positions form a frustoconical shape. Each of the diaphragms 88 includes an integral annular seal 90 for a pneumatic sealing engagement against the face 30 of the stationary cylinder 12 about the piston heads 76 of each of the pistons 64, 66, 68, 70, 72, and 74. A threaded inlet 91 allows fluid pressure to engage the diaphragm 88. Air pressure in inlet 91 compresses the diaphragm 88 which in turn drives the piston head 76 and piston shaft 78 in a linear, axial direction. The linear force applied by piston shaft 78 is thus a function of the air pressure engaging diaphragm 88 and the size of area 81. The stationary end cap 14 further includes peripherally disposed slots or air inlets 92. Each of the inlets 92 is open in both an axial and radial direction relative to the stationary end cap 14. Each of the inlets 92 is associated with one of the air channel portions 38 of the stationary cylinder 12.

The second piece or portion of the housing 10 is linearly slideable to and away from the first piece or portion of the housing 10 including cylinder 12, end cap 14, and guide 16. This second housing piece includes a drive ring or drive plate 94 with the reduced diameter annular surface 96 and the greater diameter annular surface 98 in which is press fit the outer race 100 of bearing 102. In the preferred form, the diameter of surface 96 is equal to that of surface 44. The inner race 104 of the bearing 102 is press fit on the rotor 106. The drive plate 94 further includes first and second respective faces 108 and 110. Surface 110 terminates in a surface 109 extending axially and radially inwardly to surface 98. The drive plate 94 further includes six air channel portions 111 which are elliptical in section transverse to the hub 26 and extend generally in an axial direction from the first face 108 to the second face 110, but also extend slightly inwardly from the outer periphery of the first face 108 to the inner periphery of the second face 110. Each of the channel portions 111 includes an outlet 112. The drive plate 94 further includes bores 113 which are aligned with bores 58 for slideably receiving dowel pins 59. The dowel pins 59 maintain a linear alignment and the same rotatable position between the piston guide 16 and the drive ring 94 as the drive ring 94 slides axially to and away from piston guide 16.

A shroud 114 is fixed to drive plate 94 via the pin connectors 116. The shroud 114 includes the annular deflector or guide plate portion 118 of a frustoconical shape extending axially and inwardly from the drive plate 94 to the rotor 106 generally parallel to but spaced radially outward of surface 109. The deflector plate portion 118 includes the distal end 120 and creates an air chamber 121 between the rotor 106 and the drive plate 94. The deflector plate portion 118 is disposed radially outward of the outlets 112 of channel portions 111 such that air exiting the outlets 112 is directed toward the rotatable hub 26. The shroud 114 further includes the proximal annular end flange 122 extending over the peripheral surface of plate 94 and slideably extending over the annular surface 62 of the piston guide 16 to minimize communication with a gap formed between the piston guide 16 and the drive ring 94 when the piston heads 80 drive the drive ring 94 from the piston guide 16.

The rotor or interface disc 106 includes an annular, axially extending rotor base 134 having an inner surface 124 on which is formed splines 126. Splines 126 slideably engage with splines 128 formed on the hub 26 thereby allowing the rotor 106 to slide axially on the hub 26 but maintain the same relative rotational position. Such a sliding action occurs when the piston ends 80 engage the face 108 of the drive ring 94 to thereby, through the bearing 102, transmit a linear force to the rotor 106 and to, in turn, rotatably relate or bring the interfaces 130 and 132 into engagement.

The rotor 106 further includes a frustoconical annular projection 136 integrally extending from the base 134. Projection 136 is defined by the annular face 138 extending radially from base 134 and the oblique face 140 extending nonradially from base 134. Face 140 from its first axial end to its second axial end is of an increasing size towards face 138 and plate 94 and is parallel to surface 109 and deflector plate portion 118. Surface 140 is spaced radially inwardly of deflector plate portion 118. The rotor 106 further includes the radially extending plate 141 which is integral with and extends from the base 134. Rotor 106 also includes the radially extending annular plate 142 having an outer diameter equal to that of plate 141 and an inner diameter greater than base 134 and projection 136. Plate 142 is intermediate the first and second axial ends of the face 140 and held in a spaced, parallel relation to interface plate 141 by a plurality of circumferentially spaced webs 146 integrally extending therebetween. A frustoconical connection plate 143 extends between the outer diameter of projection 136 and the inner diameter of plate 142, with plate 143 extending generally perpendicular to surface 109, deflector plate portion 118, and face 140, in the most preferred form. Openings 144 are formed in the frustoconical plate 143 and provide communication into the channels formed between the plates 141 and 142 and webs 146. Base 134 includes a contoured portion 148 formed between plate 141 and oblique face 140.

Openings 150 are formed in webs 146 to provide communication between the channels formed by webs 146, with openings 150 having an inner radial size corresponding to contoured portions 148 and an outer radial size spaced from and parallel to face 140 at a spacing generally equal to the distance of the inner diameter of plate 142 from face 140.

On the spoke like portions of plate 143 intermediate openings 144 are mounted blades or air draw means 152 for drawing air into the channels through openings 144 and from the air chamber 121 about the hub 26 and from the outlets 112 of the channel portions 111 as the rotor 106 is rotated. Each of the blades 152 includes a central portion 156 with a shape and size for abutting with the spoke like portions of plate 143 intermediate circumferentially adjacent openings 144. Central portion 156 includes two holes 158 for receiving pin connectors 154 threaded into plate 143 for fixing blades 152 to plate 143. Blades 152 include first and second blade portions 160 integrally extending outward from the opposite circumferentially spaced edges of central portion 156 at an obtuse angle. Blade portions 160 have a height equal to one half of the distance between the radially spaced edges of central portion 156, with the first blade portion 160 having an inner edge contiguous with the radially inner edge of central portion 156 and the second blade portion 160 having an outer edge contiguous with the radially outer edge of central portion 156. Blade portions 160 extend at least partially over holes 144.

The rotor 106 further includes a multiplicity of circumferentially spaced fins 162 extending in an axial direction from the radial plate 142 towards plate 94. Fins 162 include the lower edge 166 lying generally parallel to and spaced radially outward of the deflector portion 118 of the shroud 114.

The rotor 106 further includes the inset radially extending wall 168 for abutting one end of a coil spring 170 which surrounds the rotatable hub 26. The other end of coil spring 170 abuts the inner race 172 of a bearing 174, with race 172 being slid on the rotatable hub 26. Coil spring 170 urges the rotor 106 against axial movement actuated by the pistons 64, 66, 68, 70, 72, and 74. Thus, the coil spring 170 moves the interface discs from a rotatably related condition to a rotatably independent condition. The outer race 176 of bearing 174 is slid into the inner annular surface 178 of the pilot mount disc 180. The pilot mount disc or interface disc 180 is further rotatably mounted relative to the rotatable hub 26 by bearing 186. The outer race 182 of bearing 186 is slid into the inner annular surface 178 and sandwiched with race 176 by a snap retainer ring 183. Inner race 184 of the bearing 186 is slid on the rotatable hub 26 and sandwiched with race 172 against a shoulder formed on hub 26 by spring 170. The interface 132 in the form of a friction ring is removably mounted to the pilot mount disc 180 via the pin connector 188.

Now that the construction of clutch A according to the teachings of the preferred embodiment of the present invention has been set forth, subtle features and advantages of the preferred construction of the present invention can be appreciated. It can then be appreciated that as fluid pressure is introduced into inlets 91 associated with one set of pistons 64 and 66, 68 and 70 or 72 and 74, the respective diaphragms 88 are compressed, driving the respective pistons 64, 66, 68, 70, 72, and 74 linearly in the axial direction. As the pistons 64, 66, 68, 70, 72, and 74 are driven, the respective piston ends 80 bring a linear force to bear on respective diametrically opposite portions of the drive ring 94, which thereby is slid in the axial direction toward the interface 132. The drive ring 94 transmits such a linear force to the rotor 106 through the bearing 102. The rotor 106 is thereby also slid in the axial direction toward the interface surface of friction ring 132 against the bias of spring 170. Thus, the interface surface 130 on plate 141 of the rotor 106 may be rotatably related to or engaged with the interface surface of friction ring 132. Since the rotor 106 is urged in the opposite axial direction by coil spring 170, release or reduction of the air pressure in inlets 91 leads to a respective decompression or partial decompression of the respective diaphragms 88, which in turn permits coil spring 170 to axially slide the rotor 106 and drive ring 94 into respectively a rotatably independent position or a rotatably related position with a lesser amount of torque. As the rotor 106 and drive ring 94 return in the opposite axial direction, the drive ring 94 pushes against the respective ends 80 of the pistons 64, 66, 68, 70, 72, and 74 to return them towards a rest position, where the drive ring 94 abuts the stationary cylinder 12.

It can be appreciated that each of the pistons 64 and 66, 68 and 70, and 72 and 74 in the respective first, second, and third sets operate together. For example, when fluid pressure is applied to piston 64, it is also applied at the same time to the diametrically opposite piston 66. Since the outer surface area 81 of the piston head 76 of each of the pistons 64 and 66 is the same, each of the pistons 64 and 66 is driven with the same linear force for diametric balance.

It can therefore be appreciated that, for a given amount of fluid pressure, the first set of pistons 64 and 66 is driven with a greater amount of force than the second set of pistons 68 and 70, as the outer surface area 81 of each of the piston heads 76 of the first set of pistons 64 and 66 is greater than the outer surface area 81 of each of the piston heads 76 of the second set of pistons 68 and 70. Likewise, for a given fluid pressure, the second set of pistons 68 and 70 is driven with a greater amount of force than the third set of pistons 72 and 74. Thus, the sets of pistons 64 and 66, 68 and 70, and 72 and 74 move the interface discs from the second condition to the first condition where the discs are rotatably independent or rotatably related.

Each of the sets of pistons 64 and 66, 68 and 70, and 72 and 74 may be operable independently or in combination with each of the other sets of pistons. It can therefore be appreciated that pistons 64, 66, 68, 70, 72, and 74 may exert varying degrees of force against the drive ring 94 and rotor 106, thereby interfacing and rotatably relating rotor 106 and disc 180 with varying degrees of torque.

It can further be appreciated that clutch torque is directly related to air pressure. Relatively low torque values are achieved by relatively low air pressure. Relatively high torque values are achieved by relatively high air pressure.

It can further be appreciated that the diaphragm actuation feature is advantageous. Actuation of pistons 64, 66, 68, 70, 72, and 74 via diaphragms 88 permits negligible drag. Hence lower torque and lower air pressure operation is more manageable.

It can further be appreciated that the torque between the interfaces 130 and 132 is highly variable with the present invention. For example, for the greatest amount of torque, full or any desired level of air pressure is supplied to all pistons 64, 66, 68, 70, 72, and 74. Subsequently, as torque demands decrease, as an example, pressure to pistons 64 and 66 with the largest diametrical piston heads 76 may be reduced while the pressure to the remaining pistons 68, 70, 72, and 74 is maintained. When the pressure to the pistons 64 and 66 is reduced to zero, pressure to the pistons 68 and 70 with the piston heads 76 of intermediate diametrical size may be reduced, and then finally reduced to zero. Lastly, pressure to the pistons 72 and 74 with the piston heads 76 of the smallest diametrical size may be reduced, and then also finally reduced to zero such that spring 170 moves interfaces 130 and 132 to their rotatably independent condition. Such a scenario provides low torque, high pressure control by reducing air pressure as well as deactivating first those pistons 64 and 66 with piston heads 76 of greater diameter. Thus, torque load is decreased incrementally by both slowly reducing air pressure to each of the sets of pistons 64 and 66, 68 and 70, and 72 and 74 one set at a time and by dropping out one at a time the set of pistons 64 and 66, 68 and 70, or 72 and 74. It should be noted that, if desired, torque load may be incrementally increased by employing the opposite scenario. It can be appreciated that, if desired, pistons 68 and 70 or pistons 72 and 74 could be dropped out first, with the remaining sets of pistons 64, 66, 68, 70, 72, and 74 being dropped out sequentially in any desired order.

It can further be appreciated that diaphragm operation and the dissimilar diametrical size of the piston heads 80 contribute to the control of clutch A at low torque values. The smaller piston head diameters and the negligible drag provided by the inclusion of diaphragms 88 allow control at relatively low torque loads while actuation of the pistons 64, 66, 68, 70, 72, and 74 with piston heads 76 of a larger diameter, or actuation of all the pistons 64, 66, 68, 70, 72, and 74, provide for meeting relatively large torque loads, including large initial torque loads.

Further, it can be appreciated that the interface disc or rotor 106 includes a unique cooling mechanism. Specifically, as the disc 106 rotates with the hub 26, webs 146 draw air through openings 144 and into the channels of rotor 106. Further, blades 152 draw air from chamber 121 about the base 134 for passage through the openings 144 and into the channels of rotor 106. Such air is then conveyed by the rotation of the interface disc 106 radially out of the channels, thereby removing heat from the interface 130 and rotor 106. Rotor 106 may be described as a flow inducing rotor.

It can further be appreciated that webs 146 and fins 162 create a pressure gradient along their faces. The pressure gradient may cause air to be drawn from the high pressure area, near base 134 of rotor 106 and adjacent the contoured portion 148, to the low pressure area, about the periphery of the rotor 106. Such a pressure gradient aids the blades 152 in drawing air from the hub 26 and through the openings 144.

It can further be appreciated that air flow is induced through the openings 144 regardless of the direction of rotation of the rotor 106. Webs 146 and the fins 162 induce air flow regardless of the direction of rotation. Further, the blades 152 include two blade portions 160 extending in opposite directions, one clockwise and the other counterclockwise, to induce such air flow regardless of the direction of rotation.

It can be appreciated that channel portions 38, 60, and 111, surface 109, the inner surface of portion 118, and face 140 of the preferred form provide a path for the air which maximizes flow and generally reduces turbulence. In this regard, flange 122 generally prevents entry of air between guide 16 and plate 94 and portion 118 generally prevents entry of air between housing 10 and plate 142, with two air flows intersecting at a nonparallel angle possibly creating turbulence. It can further be appreciated that the contoured portion 148 is shaped so that air forced axially forward from the openings 144 is subsequently directed radially outward toward the periphery of the rotor 106 to maximize air flow and reduce turbulence. Openings 150 provide circumferential air flow through webs 146 and between interface plate 141 and annular plate 142.

It can be appreciated that clutch A includes a unique means for supplying cool air to the rotor 106. Specifically, the air channel portions 38, 60, and 111 form an air channel or air supply channel having the inlet 92 on the distal end of the housing 10 and the outlet 112 on the proximal end of the housing 10. In typical applications, air is relatively cooler at the distal end of the housing 10 than air adjacent to the proximal end of the housing 10 which is heated by air exiting the rotor 106 which has picked up heat from (and thus cooled) the rotor 106. Thus, hot air is not recirculated through clutch A according to the preferred teachings of the present invention. Cool air is drawn through the housing 10 by the spinning rotor 106 and its webs 146 and blades 152. As the cool air is drawn through the outlet 112, it is deflected or guided by the shroud plate portion 118 into the openings 144, where it is conveyed axially forward and slightly inwardly and then radially outward. Accordingly, air for cooling the interface disc 106 is drawn into the clutch A at a position remote from the rotor 106.

It should be noted that as air is drawn through adjacent channel portions 60 and 111, flange 122 acts as a seal to minimize outside air from being drawn between the piston guide 16 and drive ring 94 when such are urged apart by the piston heads 76. It can further be appreciated that both the adjacent, parallel relationship between the shroud plate portion 118 and the edges 166 of the fins 162 and the adjacent relationship between the distal end 120 of the shroud plate portion 118 and the radially extending plate 142 further contribute to the air for cooling being drawn substantially from the inlets 92 as such relationships somewhat seal the air chamber 121.

It can further be appreciated that a through shaft may be keyed to the keyway 28 and hub 26. The pilot mount disc 180 provides the means for attaching a gear, sheave, or the like. One of the shaft and hub 26 or the pilot mount disc 180 may be continuously turning and act as the input while the clutch A engages or disengages the other which would then act as the output. If the output is held stationary, engagement by clutch A would then act to slow and/or brake the input such that the rotational control apparatus A would then function as a brake.

It can further be appreciated that the inclusion of the piston guide 16 permits the mounting of the cylinder 12 and pistons 64, 66, 68, 70, 72, and 74 over the bearing 50.

It can further be appreciated that the present rotational control apparatus may provide the primary function of tension control of wind-ups and un-winds such as in wound paper in printing press applications.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

We claim:

1. Rotational control apparatus comprising, in combination: an input having an annular interface disc; an output having an annular interface disc, with the input being rotatable relative to the output about an axis, with the interface discs being concentric to the axis and having a first condition where the interface discs are rotatably related to each other and a second condition where the interface discs are rotatably independent from each other; first means for moving the interface discs from the first condition to the second condition; second means for moving the interface discs from the second condition to the first condition; and third means for moving the interface discs from the second condition to the first condition and which is controllable both independently and in combination with the second means.

2. The rotational control apparatus of claim 1 wherein at least one of the first and second interface discs are slideable, with the first, second, and third means sliding such interface discs between the first and second conditions.

3. The rotational control apparatus of claim 2 wherein each of the second and third means comprises a set of separate means diametrically opposed to each other about the axis and operable together for moving the interface discs between the first and second conditions with diametric balance.

4. The rotational control apparatus of claim 3 wherein each of the second and third means comprise fluid driven pistons.

5. The rotational control apparatus of claim 4 wherein each of the pistons includes a piston head with an outer face, with the outer faces of the pistons of the second means having a different amount of surface area than the outer face of the pistons of the third means whereby, for a given amount of pressure, the second means delivers a linear force different in degree from the third means.

6. The rotational control apparatus of claim 5 wherein a diaphragm is disposed about each of the outer faces of each of the pistons to form air chambers between the diaphragms and the respective outer faces.

7. The rotational control apparatus of claim 1 wherein the second and third means each move the interface discs with a linear force, with the linear force of the second means being different in degree from the third means.

8. The rotational control apparatus of claim 7 wherein each of the second and third means comprises at least a first piston which is driven by fluid pressure, with the fluid pressure at least to one of the second and third means being variable.

9. The rotational control apparatus of claim 8 wherein the piston of each of the second and third means comprises an outer face against which the fluid pressure acts, with the outer face of the piston of the second means having an area different than the piston of the third means.

10. The rotational control apparatus of claim 7 wherein each of the second and third means comprises at least a first piston having an outer face against which fluid pressure acts, with the outer face of the piston of the second means having an area different than the piston of the third means.

11. The rotational control apparatus of claim 1 wherein one of the interface discs comprises, in combination: a base; a radially extending annular plate having an inner diameter and an outer periphery, with the inner diameter being of a larger diametric size than the base; a nonradial face extending obliquely from the base, with the nonradial face having a first axial end and a second axial end, with the second axial end having a larger diametric size than the first axial end, with the annular plate located intermediate the first and second axial ends of the nonradial face, with an inlet formed intermediate the nonradial face and the inner diameter of the annular plate; and means for drawing air to flow through the inlet and radially outward of the outer periphery of the annular plate.

12. The rotational control apparatus of claim 11 wherein the second and third means comprises a housing having proximal and distal ends, with the proximal end located adjacent to and the distal end located remote from one of the interface discs, with at least a first channel radially spaced from the axis and extending generally in an axial direction in the housing, with the channel having an inlet and an outlet, with the inlet being adjacent the distal end of the housing and the outlet being adjacent the proximal end of the housing adjacent to one of the interface discs; and with air being drawn by the rotation of at least one of the input and the output through the channel to the interface discs to thereby cool the apparatus whereby air for cooling the interface discs is supplied to the interface discs from a location remote from the interface discs.

13. The rotational control apparatus of claim 1 wherein the second and third means comprises a housing having proximal and distal ends, with the proximal end located adjacent to and the distal end located remote from one of the interface discs, with at least a first channel radially spaced from the axis and extending generally in an axial direction in the housing, with the channel having an inlet and an outlet, with the inlet being adjacent the distal end of the housing and the outlet being adjacent the proximal end of the housing adjacent to one of the interface discs; and with air being drawn by the rotation of at least one of the input and the output through the channel to the interface discs to thereby cool the apparatus whereby air for cooling the interface discs is supplied to the interface discs from a location remote from the interface discs.

14. Interface disc comprising, in combination: a base; a radially extending annular plate having an inner diameter and an outer periphery, with the inner diameter being of a larger diametric size than the base; a nonradial face extending obliquely from the base, with the nonradial face having a first axial end and a second axial end, with the second axial end having a larger diametric size than the first axial end, with the annular plate located intermediate the first and second axial ends of the nonradial face, with an inlet formed intermediate the nonradial face and the inner diameter of the annular plate; and means for drawing air to flow through the inlet and radially outward of the outer periphery of the annular plate.

15. The interface disk of claim 14 wherein the base further includes a contoured portion extending from the first axial end away from the second axial end for directing air to flow radially outward.

16. The interface disc of claim 15 further compressing, in combination: an interface plate extending radially from the base, with the contoured portion terminating in the interface plate, with the drawing means comprising circumferentially spaced webs extending between the interface plate and the annular plate.

17. The interface plate of claim 16 wherein the webs include openings to provide circumferential air flow between the interface plate and the annular plate.

18. The interface disc of claim 14 wherein the drawing means comprises a blade located adjacent to the inlet to aid in drawing air into the inlet when the interface disc is rotated.

19. The interface disc of claim 18 further comprising, in combination: a connection plate extending between the nonradial face and the inner diameter of the annular plate, with the connection plate having at least one opening formed therein forming the inlet, with the blade connected to the connection plate.

20. The interface disc of claim 18 wherein the blade comprises two blade portions and a central portion, with the blade portions being offset from each other and extending obliquely relative to the central portion of the blade.

21. Rotational control apparatus comprising, in combination: an input having an interface disc; an output having an interface disc and being rotatable relative to the input about an axis, with the interface discs having a first condition where the interface discs are rotatably related to each other and a second condition where the interface discs are rotatably independent from each other, with the interface discs having an axis; and means for moving the interface discs between the first and second conditions, with the moving means comprising a housing having proximal and distal ends, with the distal end located adjacent to and the proximal end located remote from one of the interface discs, with at least a first channel formed in the housing, with the channel having a cross sectional size considerably smaller than that of the housing, with the channel being radially spaced from the axis and extending generally in an axial direction in the housing, with the channel having an inlet and an outlet, with the inlet being adjacent the distal end of the housing and the outlet being adjacent the proximal end of the housing adjacent to one of the interface discs, and with air being drawn by the rotation of at least one of the input and the output through the channel to the interface discs to thereby cool the apparatus whereby air for cooling the interface discs is supplied to the interface discs from a location remote from the interface discs.

22. The rotational control apparatus of claim 21 further comprising, in combination: a guide extending between the housing and one of the interface discs, with the guide being disposed radially outward of and adjacent to the outlet of the channel, and with the guide extending from a peripheral region of the housing radially inwardly toward the axis to deflect air exiting the channel radially inwardly toward the axis.

23. The rotational control apparatus of claim 21 wherein the channel include portions which are elliptical in section transverse to the axis.

24. Rotational control apparatus comprising, in combination: an input having an interface disc; an output having an interface disc and being rotatable relative to the input, with the interface discs having a first condition where the interface discs are rotatably related to each other and a second condition where the interface discs are rotatably independent from each other, with the interface discs having an axis; and means for moving the interface discs between the first and second conditions, with the moving means comprising a housing having proximal and distal ends, with the distal end located adjacent to and the proximal end located remote from one of the interface discs, with at least a first channel extending generally in an axial direction in the housing, with the channel having an inlet and an outlet, with the inlet being adjacent the distal end of the housing and the outlet being adjacent the proximal end of the housing adjacent to one of the interface discs, and with air being drawn by the rotation of at least one of the input and the output through the channel to the interface discs to thereby cool the apparatus whereby air for cooling the interface discs is supplied to the interface discs from a location remote from the interface discs; wherein the channel has a decreasing radial spacing from the axis from the proximal to the distal end to direct air toward the axis.

25. Rotational control apparatus comprising, in combination: an input having an interface disc; an output having an interface disc and being rotatable relative to the input, with the interface discs having a first condition where the interface discs are rotatably related to each other and a second condition where the interface discs are rotatably independent from each other, with the interface discs having an axis; and means for moving the interface discs between the first and second conditions, with the moving means comprising a housing having proximal and distal ends, with the distal end located adjacent to and the proximal end located remote from one of the interface discs, with at least a first channel extending generally in an axial direction in the housing, with the channel having an inlet and an outlet, with the inlet being adjacent the distal end of the housing and the outlet being adjacent the proximal end of the housing adjacent to one of the interface discs, and with air being drawn by the rotation of at least one of the input and the output through the channel to the interface discs to thereby cool the apparatus whereby air for cooling the interface discs is supplied to the interface discs from a location remote from the interface discs; wherein the housing comprises, in combination: two pieces relatively axially slideable apart from each other, with the channel running through each of the pieces; and means for sealing the two pieces relative to each other when slideable apart to minimize the amount of outside air which may be drawn between the two pieces and into the channel.

26. A method for moving two interface discs by force between a first condition and a second condition, with the interface discs being rotatable relative to each other about an axis and being concentric to the axis, with the interface discs in the first condition being rotatably related to each other and in the second condition being rotatably independent from each other, the method comprising the steps of: moving the interface discs from the first condition to the second condition; moving the interface discs from the second condition to the first condition with a first degree of force; and moving the interface discs from the second condition to the first condition with a second degree of force both independently and in combination with the first degree of force.

27. The method of claim 26 wherein the steps of moving the interface discs from the second condition to the first condition comprises the steps of moving the interface discs from the second condition to the first condition with the degree of force being variable.

28. The interface disc of claim 14 wherein the nonradial face is frustoconical in shape in axial cross sections.

* * * * *

UNITED STATES PATENT AND TRADEMARK OFFICE
CERTIFICATE OF CORRECTION

PATENT NO. : 5,586,635

DATED : December 24, 1996

INVENTOR(S) : Chris Nelson et al.

It is certified that error appears in the above-indentified patent and that said Letters Patent is hereby corrected as shown below:

Column 3, line 18, cancel "18o" and substitute therefor --18.--.

Column 4, line 19, cancel "ill" and substitute therefor --in--.

Column 11, line 24, cancel "disk" and substitute therefor --disc--.

Column 11, line 28, cancel "compressing" and substitute therefor

--comprising-.

Signed and Sealed this

Eighth Day of July, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,586,635

DATED : December 24, 1996

INVENTOR(S) : Chris Nelson et al.

It is certified that error appears in the above-identified patent and that said Letters Patent is hereby corrected as shown below:

Cover page, under item [56], add:

```
--3,335,834    8/1967    Horst-Egon Wach .
  4,712,660   12/1987    Erndt et al. .

FOREIGN PATENT DOCUMENTS 0171164     2/1986     European .
  0255614     2/1988     European .
  2244542    12/1991     Great Britain .
  2244543    12/1991     Great Britain .
  2251041     6/1992     Great Britain .
 63067432     3/1988     Japan .--.
```

Signed and Sealed this

Thirty-first Day of March, 1998

Attest:

BRUCE LEHMAN

*Attesting Officer*             *Commissioner of Patents and Trademarks*